United States Patent
Katsuragi et al.

(10) Patent No.: US 11,701,911 B2
(45) Date of Patent: *Jul. 18, 2023

(54) METHOD OF PRINTING STEALTH WHITE IMAGE, SET OF SUBSTRATE AND STEALTH INK, AND PRINTING DEVICE

(71) Applicant: RICOH COMPANY, LTD., Tokyo (JP)

(72) Inventors: Koji Katsuragi, Kanagawa (JP); Haruki Saitoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 299 days.

This patent is subject to a terminal disclaimer.

(21) Appl. No.: 17/097,010

(22) Filed: Nov. 13, 2020

(65) Prior Publication Data

US 2021/0146708 A1    May 20, 2021

(30) Foreign Application Priority Data

Nov. 18, 2019  (JP) ................. 2019-208109
Oct. 6, 2020   (JP) ................. 2020-168912

(51) Int. Cl.
| | | |
|---|---|---|
| *B41M 3/14* | (2006.01) | |
| *C09D 11/40* | (2014.01) | |
| *C09D 11/36* | (2014.01) | |
| *B41J 2/175* | (2006.01) | |
| *B41J 29/13* | (2006.01) | |
| *B42D 25/387* | (2014.01) | |
| *C09D 11/50* | (2014.01) | |
| *C09D 11/322* | (2014.01) | |
| *B41M 3/00* | (2006.01) | |

(52) U.S. Cl.
CPC .............. *B41M 3/144* (2013.01); *B41J 2/175* (2013.01); *B41J 2/17509* (2013.01); *B41J 2/17513* (2013.01); *B41J 2/17553* (2013.01); *B41J 29/13* (2013.01); *B42D 25/387* (2014.10); *C09D 11/322* (2013.01); *C09D 11/36* (2013.01); *C09D 11/40* (2013.01); *C09D 11/50* (2013.01); *B41M 3/008* (2013.01); *B41M 3/14* (2013.01)

(58) Field of Classification Search
CPC .... B41J 2/175; B41J 2/17509; B41J 2/17513; B41J 2/17553; B41J 29/13; B41M 3/144; B41M 3/14; B41M 3/008; B42D 25/387; C09D 11/40; C09D 11/36; C09D 11/50; C09D 11/322
See application file for complete search history.

(56) References Cited

FOREIGN PATENT DOCUMENTS

| JP | 10-287034 | | 10/1998 |
|---|---|---|---|
| JP | 2000-191965 | | 7/2000 |
| JP | 2002-179968 | | 6/2002 |
| JP | 2003-001935 | | 1/2003 |
| JP | 2003-73589 | * | 3/2003 |
| JP | 2003-082263 | | 3/2003 |
| JP | 2013-173267 | | 9/2013 |

* cited by examiner

*Primary Examiner* — Patrick D Niland
(74) *Attorney, Agent, or Firm* — Grüneberg and Myers, PLLC

(57) ABSTRACT

A method of printing a stealth white image includes applying a stealth ink containing a red coloring material that emits visible light at exposure to ultraviolet radiation and a green coloring material that emits visible light at exposure to ultraviolet radiation to a substrate which contains a fluorescent brightener to form the stealth white image thereon, wherein the stealth white image demonstrates an a* value of from −2.0 to 2.0 and a b* value of from −10.0 to 0 at exposure to ultraviolet radiation having a wavelength of 370 nm according to CIE 1976 L*a*b* colorimetric system.

14 Claims, 5 Drawing Sheets

METHOD OF PRINTING STEALTH WHITE IMAGE, SET OF SUBSTRATE AND STEALTH INK, AND PRINTING DEVICE

CROSS-REFERENCE TO RELATED APPLICATIONS

This patent application is based on and claims priority pursuant to 35 U.S.C. § 119 to Japanese Patent Application Nos. 2019-208109 and 2020-168912, filed on Nov. 18, 2019 and Oct. 6, 2020, respectively, in the Japan Patent Office, the entire disclosures of which are hereby incorporated by reference herein.

BACKGROUND

Technical Field

The present disclosure relates to a method of printing stealth white image, a set of a substrate and stealth ink, and a printing device.

Description of the Related Art

Various printed matter, checks, envelopes, and packages are widely marked by bar code for security and verification. Some specific marking methods employ printing with transparent or low coloring ink invisible to human eyes and rendering the ink visible at exposure to specific light such as ultraviolet radiation or infrared radiation. Special ink called stealth ink are used in such methods.

SUMMARY

According to embodiments of the present disclosure, a method of printing a stealth white image is provided which includes applying a stealth ink containing a red coloring material that emits visible light at exposure to ultraviolet radiation and a green coloring material that emits visible light at exposure to ultraviolet radiation to a substrate which contains a fluorescent brightener to form the stealth white image thereon, wherein the stealth white image demonstrates an a* value of from −2.0 to 2.0 and a b* value of from −10.0 to 0 at exposure to ultraviolet radiation having a wavelength of 370 nm according to CIE 1976 L*a*b* colorimetric system.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
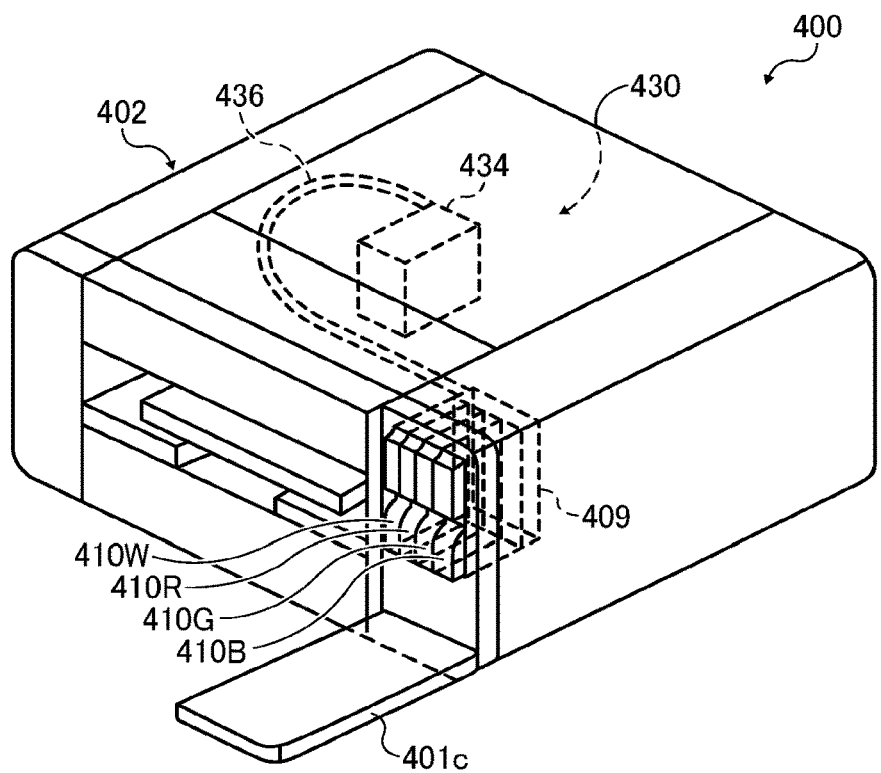
FIG. 1 is a schematic diagram illustrating a perspective view of an example of an ink discharging device.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Embodiments of the present disclosure are described below but are not limiting the present invention. The following is a description for illustration purpose only and the present disclosure is not limited thereto.

Aspects of the present disclosure are, for example, as follows.

(1) A method of printing a stealth white image includes applying a stealth ink containing a red coring material that emits visible light at exposure to ultraviolet radiation and a green coring material that emits visible light at exposure to ultraviolet radiation to a substrate containing a fluorescent brightener to form the stealth white image,
wherein the stealth white image demonstrates an a* value of from −2.0 to 2.0 and a b* value of from −10.0 to 0 at exposure to ultraviolet radiation having a wavelength of 370 nm according to CTE 1976 L*a*b* colorimetric system.

(2) The method according to (1) mentioned above, wherein, in the applying, the mass ratio of the red coloring material and the green coloring material in the stealth ink is changed depending on a blue color tone of light the substrate emits at exposure to ultraviolet radiation.

(3) The method according to (1) or (2) mentioned above, wherein the stealth ink A demonstrates two fluorescence emission maxima of from 605 to 645 nm and from 505 to 545 nm at exposure to ultraviolet radiation having a wavelength of 365 nm.

(4) The method according to any one of (1) to (3) mentioned above, wherein the stealth ink contains an organic solvent having a mixing SP value of 13.0 (cal/cm$^3$)$^{0.5}$ or greater.

(5) The method according to any one of (1) to (4) mentioned above, wherein the stealth ink further contains a polyether polyol.

(6) The method according to any one of (1) to (5) mentioned above further includes applying a stealth non-white ink.

(7) The method according to any one of (1) to (6) mentioned above further includes drying the stealth ink after the applying.

(8) The method according to (6) or (7) mentioned above further includes applying a stealth non-white ink after the drying (9) The method according to (8) mentioned above, wherein, in the applying the stealth ink, the stealth ink is applied to the entire surface of the substrate or the same region of the substrate where the stealth non-white ink is to be applied.

(10) A set of a substrate and a stealth ink contains the substrate containing a fluorescent brightener and the stealth ink containing a first stealth ink containing a red coloring material that emits visible light at exposure to ultraviolet radiation and a green coloring material that emits visible light at exposure to ultraviolet radiation and a second stealth ink, wherein printed matter having the substrate with the first stealth ink applied thereto has an a* value of from −2.0 to 2.0 and a b* value of from −10.0 to 0 at exposure to ultraviolet radiation having a wavelength of 370 nm according to CIE 1976 L*a*b* colorimetric system.

(11) The set according to (10) mentioned above, wherein the second stealth ink contains at least one member selected from the group consisting of a red coloring material that emits visible light at exposure to ultraviolet radiation, a green coloring material that emits visible light at exposure to ultraviolet radiation, and a blue coloring material that emits visible light at exposure to ultraviolet radiation.

(12) The set according to (10 or (11) mentioned above, wherein the mass ratio of the red coloring material and the green coloring material in the first stealth ink is changed depending on a blue color tone of light the substrate emits at exposure to ultraviolet radiation.

(13) A printing device includes a container containing an ink that contains a stealth ink containing a red coloring material that emits visible light at exposure to ultraviolet radiation and a green coloring material that emits visible light at exposure to ultraviolet radiation, an ink discharging head that discharges the ink to a substrate which contains a fluorescent brightener and a circulation assembly including a pressure generating device which circulates the ink, wherein a stealth white image obtained with the stealth ink demonstrates an a* value of from −2.0 to 2.0 and a b* value of from −10.0 to 0 at exposure to ultraviolet radiation having a wavelength of 370 nm according to CIE 1976 L*a*b* colorimetric system.

(14) The printing device according to (13) mentioned above, wherein the ink further contains a stealth non-white ink.

The method of printing a stealth white image (hereinafter also referred to printing method) of the present disclosure includes applying a stealth ink containing a red coring material that emits visible light at exposure to ultraviolet radiation and a green coring material that emits visible light at exposure to ultraviolet radiation to a substrate containing a fluorescent brightener to form a stealth white image thereon, wherein the stealth white image has an a* value of from −2.0 to 2.0 and a b* value of from −10.0 to 0 at exposure to ultraviolet radiation having a wavelength of 370 nm according to CIE 1976 L*a*b* colorimetric system.

In the printing method of the present disclosure, the printed matter having a substrate printed with the stealth ink thereon demonstrates an a* value of from −2.0 to 2.0 and a b* value of from −10.0 to 0 at exposure to ultraviolet radiation of 370 nm. The ideal color tone of white is a*=b*=0. In reality, b* in the tone of the white portions of displays of mobile phones or computers for daily use is shifted to below zero. This is to visually emphasize white by slightly shifting to blue on purpose. In the present disclosure, the center value of b* is −5.

When the a* value is in the range of from −2.0 to 2.0 and b* is in the range of from −10.0 to 0, white is visually emphasized. Preferably, the a* value is in the range of from −2.0 to 0 and the b* is in the range of from −8.5 to −5.0. When the b* value is less than −10.0, white becomes bluish and looks blue rather than white. Conversely, when the b* value surpasses 0, white becomes yellowish and looks yellow rather than white.

Printed matter printed with the stealth ink looks different depending on the level of luminosity. It is difficult to visually confirm the difference of output colors or color omission at a luminosity of less than 0.1 mW/cm$^2$ of ultraviolet radiation. In contrast, such visual confirmation on the difference of output colors or color omission is easy at a luminosity of not less than 0.1 mW/cm$^2$ of ultraviolet radiation. However, at a luminosity of greater than 2.0 mW/cm$^2$ of ultraviolet radiation, the image may feel too bright to confirm color omission. Moreover, the image is so bright that the color of the image looks different. In the present disclosure, the luminance of ultraviolet is measured at 370 nm with an ultraviolet illuminometer under a luminance of 2.0 mW/cm$^2$.

A print sample is prepared by printing at a printing resolution of 600×600 dpi with an amount attached at 0.8 mg/cm$^2$ followed by drying at room temperature for one day and one night. The a* value and b* value of this print sample are measured.

It has not been possible to create a white image having a high whiteness (brightness) to a substrate that contains a fluorescent brightener. In the printing method of the present disclosure, white images with a high whiteness can be formed on a substrate that contains a fluorescent brightener without using a blue coloring material utilizing the fluorescent brightener emitting blue fluorescent color.

In the present disclosure, images are assumed to be printed on a substrate that contains a fluorescent brightener that emits blue light at exposure to ultraviolet radiation. In such printing, the mass ratio of the red coloring material to the green coloring material applied to the substrate is changed to demonstrate the target a* value and b* values. The mass ratio of the green coloring material is less than the red coloring material because the green coloring material has a stronger emission intensity than the red coloring material, although the mass ratio depends on the density (emission intensity) of the fluorescent brightener contained in a substrate.

The mass ratio of the red coloring material to the green coloring material applied to the substrate is not particularly limited. As the color tone of blue of the substrate becomes pale (i.e., a* is shifted to the negative side and b* is shift to the positive side), the mass ratio of the red coloring material is raised and the mass ratio of the green coloring material is lowered. To the contrary, as the color tone of blue of the substrate becomes dark (i.e., a* is shifted to the positive side and b* is shifted to the negative side), the mass ratio of the red coloring material is lowered and the mass ratio of the green coloring material is raised. This arrangement makes it possible to print with a high whiteness on different media.

The red coloring material to the green coloring material ratio by percent by mass is preferably from 1:1 to 9:1.

The stealth ink containing the red coloring material and the green coloring material is a liquid mixture in which both coloring materials are preliminarily mixed.

When the stealth white ink is exposed to 365 nm ultraviolet radiation, it is preferable that the red coloring material, the green coloring material, and the blue coloring material respectively have a fluorescence emission maximum in a range of from 605 to 645 nm, from 505 to 545 nm, and from 445 to 485 nm.

The hue angle of a dry film of a liquid dispersion containing red coloring material and a green coloring material as the base is preferably the following at exposure to ultraviolet radiation having a 370 nm wavelength.
Red liquid dispersion: hue angle=15 to 35 degrees
Green liquid dispersion: hue angle=120 to 140 degrees The dry film of liquid dispersion of each color as the base is obtained by applying each liquid dispersion at 5 ml onto a glass substrate with an amount of 0.8 mg/cm$^2$ by a bar coater followed by drying at 80 degrees C. for three hours.

The organic solvents, water, coloring materials, resins, and additives for use in the stealth ink (hereinafter also referred to as ink) are described below.

Organic Solvent

There is no specific limitation to the organic solvent for use in the present disclosure. For example, a water-soluble organic solvent can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformami de, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying at the same time.

The organic solvent in the ink preferably has a mixing SP value of 13.0 (cal/cm$^3$)$^{0.5}$ or greater to enhance the storage stability of the ink.

In the present disclosure, the mixing SP value of the organic solvent is calculated according to the following relationship only for the organic solvents having a proportion of 3.0 percent by mass or greater in the ink.

Mixing SP value (cal/cm$^3$)$^{0.5}$ of organic solvents in ink= [SP value of organic solvent $S_1$× volume fraction of organic solvent $S_1$]+ • • • +[SP value of organic solvent $S_n$× volume fraction of organic solvent $S_n$]

Polyol compounds having eight or more carbon atoms and glycol ether compounds are also suitable.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The polyhydric alcohol or polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying and discharging reliability of the ink, the proportion is preferably from 10 to 60 percent by mass and more preferably from 20 to 60 percent by mass.

Water

The proportion of water of the ink is not particularly limited and can be suitably selected to suit to a particular application. For example, in terms of enhancing the drying and discharging reliability of the ink, the proportion is preferably from 10 to 90 percent by mass and more preferably from 20 to 70 percent by mass.

Coloring Material

As the coloring material for use in the present disclosure that emits visible light at ultraviolet radiation, specific examples of the red coloring material include, but are not limited to, complexes coordinated with one or two ligands such as 4,4,4-trifluoro-1-(2-thienyl)-1,3-butanedione, 4,4,4-trifluoro-1-phenyl-1,3-butanedione, and tri-n-octyl phosphine oxide. Specific examples of the green coloring material include, but are not limited to, 3-(2-quinolylmethylene) isoindrine-3-one, 2-[2-oxo-7(dimethylamino)-2H-1-benzopylan-3yl]-1,3-dimethyl-1H-benzoimidazole-3-ium.methylsulfate, and 3-(5-chloro-2-benzooxazoyl)-7-(dimethylamino)-2H-1-benzopylan-2-one.

It is also possible to manufacture ink by mixing materials such as water and an organic solvent with a liquid dispersion which is prepared by mixing a coloring material that emits visible light at exposure to ultraviolet radiation with other materials such as water and a dispersing agent.

The proportion of the coloring material that emits visible light at ultraviolet radiation in the ink is preferably from 0.005 to 10.0 percent by mass and more preferably from 0.025 to 5.0 percent by mass to enhance intensity of emission, fixability, and discharging stability.

When the ink contains resin particles dyed with the coloring material that emits visible light at ultraviolet radiation, the proportion of the resin particles dyed with the coloring material that emits visible light at ultraviolet radiation is from 0.1 to 20 percent by mass and more preferably from 5 to 20 percent by mass of the ink.

The stealth ink of the present disclosure preferably contains resin particles to be dyed with the coloring material.

Such resin particles are obtained by aqueous emulsion polymerization, preferably composed of copolymers contained in the aqueous liquid dispersion, and more preferably have a volume average particle diameter of 200 nm or less. Discharging stability is maintained without degradation and storage stability is kept excellent without precipitation of resin particles in aqueous ink when the resin particles have a volume average particle diameter of 200 nm or less.

The volume average particle diameter can be measured by using a device such as a particle size analyzer (Nanotrac Wave-UT151, manufactured by MicrotracBEL Corp.).

Emulsion polymerization is suitably selected according to the type and the amount of surfactants. The polymerization temperature is preferably from 50 to 90 degrees C.

Specific examples of the polymerization initiator includes, but are not limited to, ammonium persulfate, potassium persulfate, and hydrogen peroxide, which can be optionally used in combination with a reducing agents.

The copolymers for use in the stealth white ink of the present disclosure are synthesized by emulsion polymerization preferably using methacrylates such as vinyl acetate, styrene, methyl methacrylate, ethyl methacrylate, and butyl methacrylate, acrylates such as methyl acrylate, ethyl acrylate, and butyl acrylate, polymeric monomers such as acrylic nitrile and methacrylonitrile, polymeric surfactants, ammonium persulfate, potassium persulfate, and hydrogen peroxide as a polymerization initiator optionally with a reducing agent in combination.

It is preferable to use the coloring material that emits visible light at exposure to ultraviolet radiation as a liquid dispersion which is prepared by dyeing resin particles with the coloring material by emulsion polymerization followed by mixing with water. The resin particles can be dyed during or after emulsion polymerization. It is preferable to stir the materials under atmospheric pressure or under an increased pressure at 40 to 110 degrees C. for one to five hours. The proportion of the coloring material to resin particles (solid portion of emulsion polymerization) is preferably from 0.01 to 15.0 percent by mass and more preferably from 0.05 to 8.0 percent by mass.

The stealth ink may contain the following resins, although the coloring material that emits visible light at exposure to ultraviolet radiation is preferably used as a liquid dispersion prepared by dyeing resin particles by emulsion polymerization followed by mixing with water.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

It is possible to use resin particles made of these resins and possible to prepare ink by mixing a resin emulsion containing resin particles which are dispersed in water as a dispersion medium with materials such as a liquid dispersion containing a coloring material and an organic solvent. It is possible to use suitably-synthesized resin particles as the resin particle. Alternatively, the resin particle available on the market can be used. The resin particle can be used alone or in combination.

The mean volume diameter (i.e., volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of the ink, it is preferably from 1 to 30 percent by mass and more preferably from 5 to 20 percent by mass of the total amount of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes particles such as resin particles and pigment particles. The particle diameter can be measured by using a particle size analyzer (Nanotrac Wave-UT151, manufactured by MicrotracBEL Corp).

Additive

The ink may further optionally include additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Specific examples of the counter ion of the salt of these fluorochemical surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethyl siloxane, one-distal-end-modified polydimethyl siloxane, and side-chain-both-distal-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitable synthetic surfactant and any product available on the market is suitable. Products are available from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

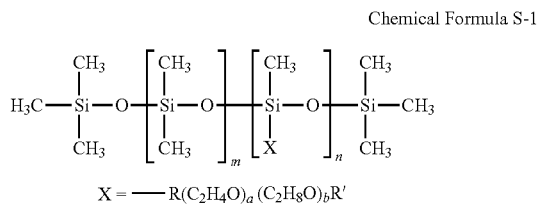

Chemical Formula S-1

In Chemical Formula S-1, "m", "n", "a", and "b" each, respectively independently represent integers, R represents an alkylene group, and R' represents an alkyl group. Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because these do not easily foam and the fluorochemical surfactant represented by the following Chemical Formula F-1 or Chemical Formula F-2 is preferable.

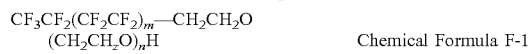

Chemical Formula F-1

In the Chemical Formula F-1, "m" is preferably 0 or an integer of from 1 to 10 and "n" is preferably 0 or an integer of from 1 to 40.

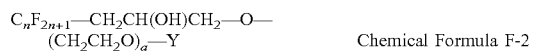

Chemical Formula F-2

In the compound represented by the Chemical Formula F-2, Y represents H or $C_mF_{2m+1}$, where m represents an integer of from 1 to 6, or $CH_2CH(OH)CH_2-C_mF_{2m+1}$, where m represents an integer of from 4 to 6, or $C_pH_{2p+1}$, where p is an integer of from 1 to 19, n represents an integer of from 1 to 6. a represents an integer of from 4 to 14.

The fluorochemical surfactant is commercially available.

Specific examples include, but are not limited to, SUR-FLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLY-FOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™, DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass to achieve excellent wettability and discharging stability and improve image quality.

Defoaming Agent

The defoaming agent has no particular limit and examples include, but are not limited to, acetylene glycol based defoaming agents, silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

pH Regulator

The pH regulator has no particular limit as long as it can control pH to be not lower than 7. Specific examples include, but are not limited to, amines such as diethanol amine and triethanol amine.

Fluorescent Brightener

In the present disclosure, a fluorescent brightener can be used to improve the effect of fluorescence of the coloring material that emits light at exposure to ultraviolet radiation. Fluorescent brighteners improve dispersibility of coloring material and enhance the effect of the coloring material by surface migration. A specific example is polyether polyol.

The proportion of the fluorescent brightener in the ink is preferably from 0.2 to 2 percent by mass and more preferably from 0.5 to 2 percent by mass to the content of the coloring material. The target brightness can demonstrate at a proportion of a fluorescent brightener of 0.2 percent by mass or greater to the content of the coloring material. Conversely, when the proportion is 2 percent by mass or less, discharging stability can be enhanced.

A specific example of the procurable fluorescent brightener is Optiact I-10 (manufactured by San Nopco Ltd.).

Properties of the ink are not particularly limited and can be suitably selected to suit to a particular application. For example, viscosity, surface tension, and pH are preferable in the following ranges.

Viscosity of the ink at 25 degrees C. is preferably from 5 to 30 mPa·s and more preferably from 5 to 25 mPa·s because print density and text quality improve and good dischargeability is demonstrated. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. because the ink suitably levels on a recording medium and the ink is dried in a shorter time.

pH of the ink is preferably from 7 to 12 and more preferably from 8 to 11 in terms of prevention of corrosion of metal material in contact with liquid.

In the present disclosure, zeta potential can be used as an index for dispersion stability of the stealth white ink.

Zeta potential is known as an index for dispersion stability of a particle and defined as the potential at the slipped surface to the zero potential at an electrically neutral region sufficiently distant from the particle. Fine particles are more stabilized as the absolute value of the zeta potential increases because repulsion between the fine particles increases. To the contrary, particles readily agglomerate as the zeta potential approaches zero.

It is preferable in the present disclosure that zeta potential at a pH of 9 of liquid diluted with deionized water to achieve a total concentration of each of the coloring materials in the stealth white ink of 0.01 percent by mass be −20 mV or lower. This zeta potential increases repulsion between particles and stabilizes the particles so that ink having excellent storage stability can be obtained.

It is preferable that zeta potential at a pH of 9 of liquid diluted with deionized water to achieve a total concentration of each of the resin particles dyed with the coloring materials that emit visible light at ultraviolet radiation of 0.01 percent by mass be −20 mV or lower to contain resin particles with the coloring material in the ink. This zeta potential increases repulsion between particles and stabilizes the particles so that ink having excellent storage stability can be obtained.

The total concentration of each coloring material or resin particles dyed with the coloring material in ink can be obtained by preliminarily isolating the coloring material or the resin particles dyed with the coloring material by subjecting ink to centrifugal. Based on the obtained concentration, the ink is diluted with deionized water to adjust the total concentration of each coloring material or resin particles dyed with the coloring material to be 0.01 percent by mass.

It is possible to add acid or alkaline aqueous solution such as hydrochloric acid water and an aqueous solution of sodium hydroxide to adjust the pH of the ink.

Substrate

The substrate (hereinafter also referred to as print medium or recording medium) is not particularly limited and includes, but are not limited to, plain paper, gloss paper, special paper, cloth, film, transparency, and printing paper for general purpose, although a fluorescent brightener is added to the substrate to make print media look more white.

Fluorescent brighteners are clear or pale yellow and dyes that emit blue-violet light at exposure to ultraviolet radiation and include, but are not limited to, stilbene-based fluorescent brighteners and benzotriazole-based fluorescent brighteners. Whether a substrate contains a fluorescent brightener can be confirmed by cutting the substrate, adding an aqueous solution of sodium hydroxide, controlling the temperature at 60 degrees C. followed by resting for 20 minutes, and extracting the components from the resulting substance by repeating collecting pulp and rinsing followed by structure analyzing the components.

It is preferable to use print media containing a fluorescent brightener and demonstrating an a* value of from 5 to 25 and a b* value of from −60 to −25.

The recording media are not limited to typical recording media and suitably include building materials such as wall paper, floor material, and tiles, cloth for apparel such as T-shirts, textile, and leather. The configuration of the paths through which the recording medium is conveyed can be changed to use materials such as ceramics, glass, and metal.

Printed Matter

The printed matter with ink in the present disclosure includes a print medium and an image formed on the print medium utilizing the printing method of the present disclosure.

The printed product can be obtained by creating images by the inkjet printing device executing the inkjet printing method.

The set of a substrate and a stealth ink of the present disclosure includes a substrate the contains a fluorescent brightener and a stealth ink that contains a first stealth ink containing a red coloring material that emits visible light at exposure to ultraviolet radiation and a green coloring material that emits visible light at exposure to ultraviolet radiation and a second stealth ink, wherein printed matter having the substrate with the first stealth ink applied thereto demonstrates an a* value of from −2.0 to 2.0 and a b* value of from −10.0 to 0 at exposure to ultraviolet radiation having a wavelength of 370 nm according to CIE 1976 L*a*b* colorimetric system.

The first stealth ink for use in the present disclosure contains a red coloring material that emits visible light at exposure to ultraviolet radiation and a green coloring material that emits visible light at exposure to ultraviolet radiation and the second stealth ink contains at least one of a red coloring material that emits visible light at exposure to ultraviolet radiation, a green coloring material that emits visible light at exposure to ultraviolet radiation, and a blue coloring material that emits visible light at exposure to ultraviolet radiation.

A white image was produced with the first stealth ink and thereafter an image is formed with the second stealth ink in the present disclosure.

The first stealth ink may be applied before the second stealth ink is applied in the present disclosure. The first stealth ink is applied to the entire surface of a substrate or the same region of a substrate as the second stealth ink is to be applied.

It is preferable to dry the first stealth ink after the first stealth ink is applied. One condition of drying the first stealth ink is at 90 degrees C. for one minute.

The second stealth ink contains at least one of a red coloring material that emits visible light at exposure to ultraviolet radiation, a green coloring material that emits visible light at exposure to ultraviolet radiation, and a blue coloring material that emits visible light at exposure to ultraviolet radiation. The same red coloring material and the green coloring material as those of the first stealth ink can be used for the second stealth ink.

Specific examples of the blue coloring material include, but are not limited to, benzooxazole fluorescent brighteners such as 1,2-bis(5-methylbenzooxazole-2-yl)ethene, 2,2'-(1, 2-ethendiyl)bis(4,1-phenylene)bisbenzooxazole, and 2,2'-(2,5-thiophendiyl)bis(5-tert-butyl benzooxazole), stilben fluorescent brighteners, and qumarin fluorescent brighteners.

The second stealth ink preferably contains the same components as for the first stealth ink, although the second stealth ink contains a coloring material different from that of the first stealth ink.

Printing Device and Printing Method

The ink for use in the present disclosure can be suitably applied by various inkjet printing devices such as printers, facsimile machines, photocopiers, multifunction peripherals (serving as a printer, facsimile machine, and photocopier), and solid freeform fabrication devices such as 3D printers and additive manufacturing devices.

In the present disclosure, the printing device and the printing method respectively represent a device capable of discharging liquids such as ink and processing fluids to a print medium and a method of printing utilizing the device. The print medium means an item to which ink or various processing fluids can be temporarily or permanently attached.

The printing device may further optionally include a device relating to feeding, conveying, and ejecting a recording medium and other devices referred to as a pre-processing device, a post-processing device in addition to the head portion to discharge the ink.

The printing device and the printing method may further optionally include a heating device (heater) for use in the heating process and a drying device (drier) for use in the drying process. For example, the heating device and the drying device heat and dry the print surface and the opposite surface of a print medium. The heating device and the drying device are not particularly limited. For example, a fan heater and an infra-red heater can be used. It is possible to heat and dry a print medium before, during, and after printing.

In addition, the printing device and the printing method are not limited to those producing meaningful visible images such as text and figures with the ink. For example, the printing method and the printing device capable of producing patterns like geometric design and 3D images are included.

In addition, the printing device includes both a serial type device in which the ink discharging head moves and a line type device in which the ink discharging head is not moved, unless otherwise specified.

Furthermore, in addition to the desktop type, this printing device includes a device capable of printing images on a wide print medium having, for example, AO size and a continuous printer capable of using continuous paper rolled in a roll-like form as a print medium.

Figure 2:
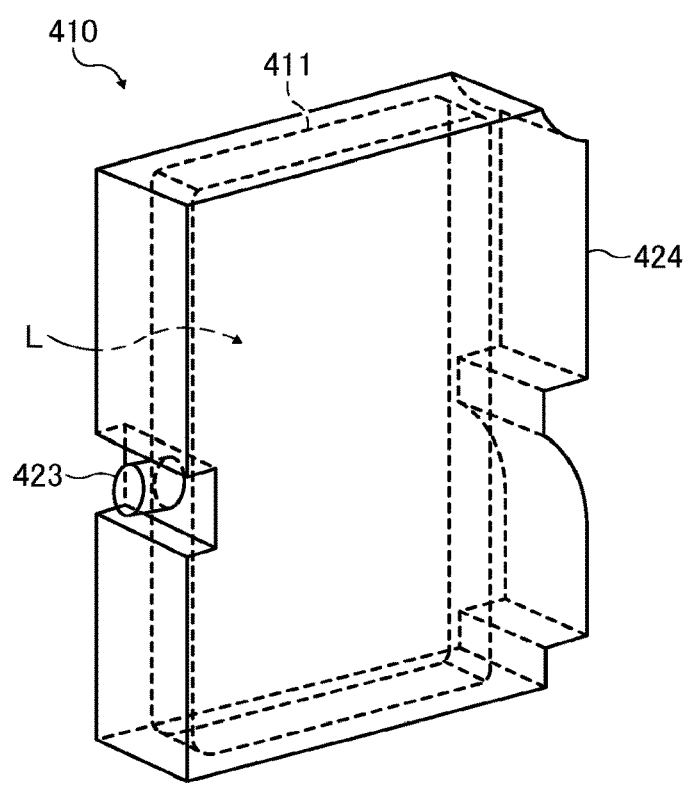
FIG. 2 is a diagram illustrating a perspective view of an example of the main tank of the ink discharging device.

The printing device is described using an example with reference to FIG. 1 and FIG. 2. FIG. 1 is a diagram illustrating a perspective view of the recording device. FIG. 2 is a diagram illustrating a perspective view of a tank. An image forming device 400, which is an embodiment of the printing device, is a serial type image forming device. A mechanical assembly 430 is disposed in an exterior 402 of the image forming device 400. Each ink accommodating unit (ink container) 411 of each tank 410 (410W, 410R, 410G, and 410B) for each color of ink mixture of red and green (red-green), red (R), green (G), and blue (B) is made of a packaging member such as aluminum laminate film. The ink accommodating unit 411 is housed in, for example, a plastic container housing unit 424 and L represents liquid contained in the ink accommodating unit 411. The tank 410 is used as an ink cartridge of each color.

A cartridge holder 409 is disposed on the rear side of the opening formed when a cover 401c is opened. The cartridge holder 409 is detachably attached to the tank 410. In this configuration, each ink discharging outlet 423 of the tank 410 communicates with a discharging head 434 for each color via a supplying tube 436 for each color and the ink can be discharged from the discharging head 434 to a print medium.

The printing device of the present disclosure includes a container containing an ink that contains a stealth ink containing a red coloring material that emits visible light at exposure to ultraviolet radiation and a green coloring material that emits visible light at exposure to ultraviolet radiation, an ink discharging head that discharges the ink to a substrate which contains a fluorescent brightener, and a circulation assembly including a pressure generating device which circulates the ink, wherein an image obtained with the stealth ink demonstrates an a* value of from −2.0 to 2.0 and a b* value of from −10.0 to 0 at exposure to ultraviolet radiation having a wavelength of 370 nm according to CIE 1976 L*a*b* colorimetric system. The discharging head may include nozzles, individual liquid chambers communicating with the nozzles, a common supplying liquid chamber that supplies the ink to the individual liquid chambers, a circulation path that communicates with the individual liquid chambers, a common circulation liquid chamber communicating with the circulation path, and a pressure generator that applies a pressure to the ink in the individual liquid chambers.

Figure 3:
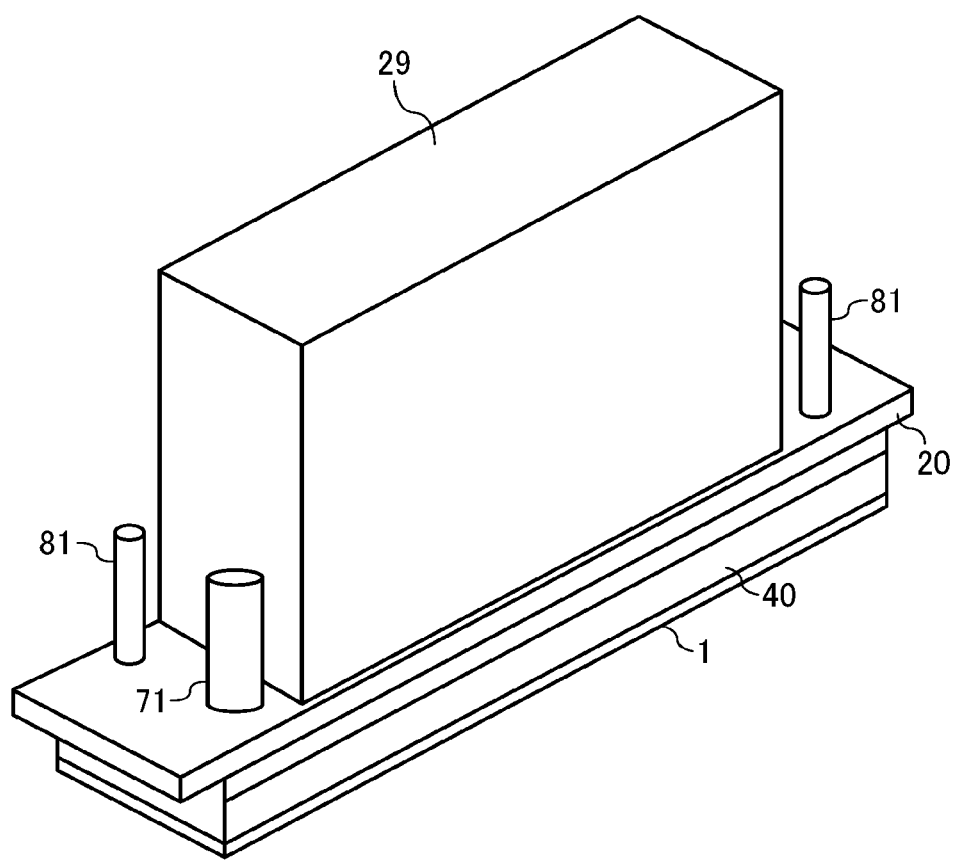
FIG. 3 is a diagram illustrating a perspective view of an example of the head.

An embodiment of the ink discharging head is described with reference to the drawings. FIG. 3 is a diagram illustrating a perspective view of an example of the head.

The head illustrated in FIG. 3 includes a common liquid chamber member 20, a supply port 71 as an influx path to flow the ink into the common liquid chamber member 20, an efflux path member 40 to flow the ink out from the common liquid chamber member 20, a nozzle plate 1 communicating with the efflux path member 40 and having a nozzle for discharging the ink, and two circulation ports 81 as a circulating device to circulate the ink in the common liquid chamber member 20.

The head may include a head cover 29.

The circulation ports 81 as the circulating device can circulate the ink in either direction.

Next, an example of the liquid circulation system using the head relating to the present embodiment is described with reference to FIG. 4.

Figure 4:
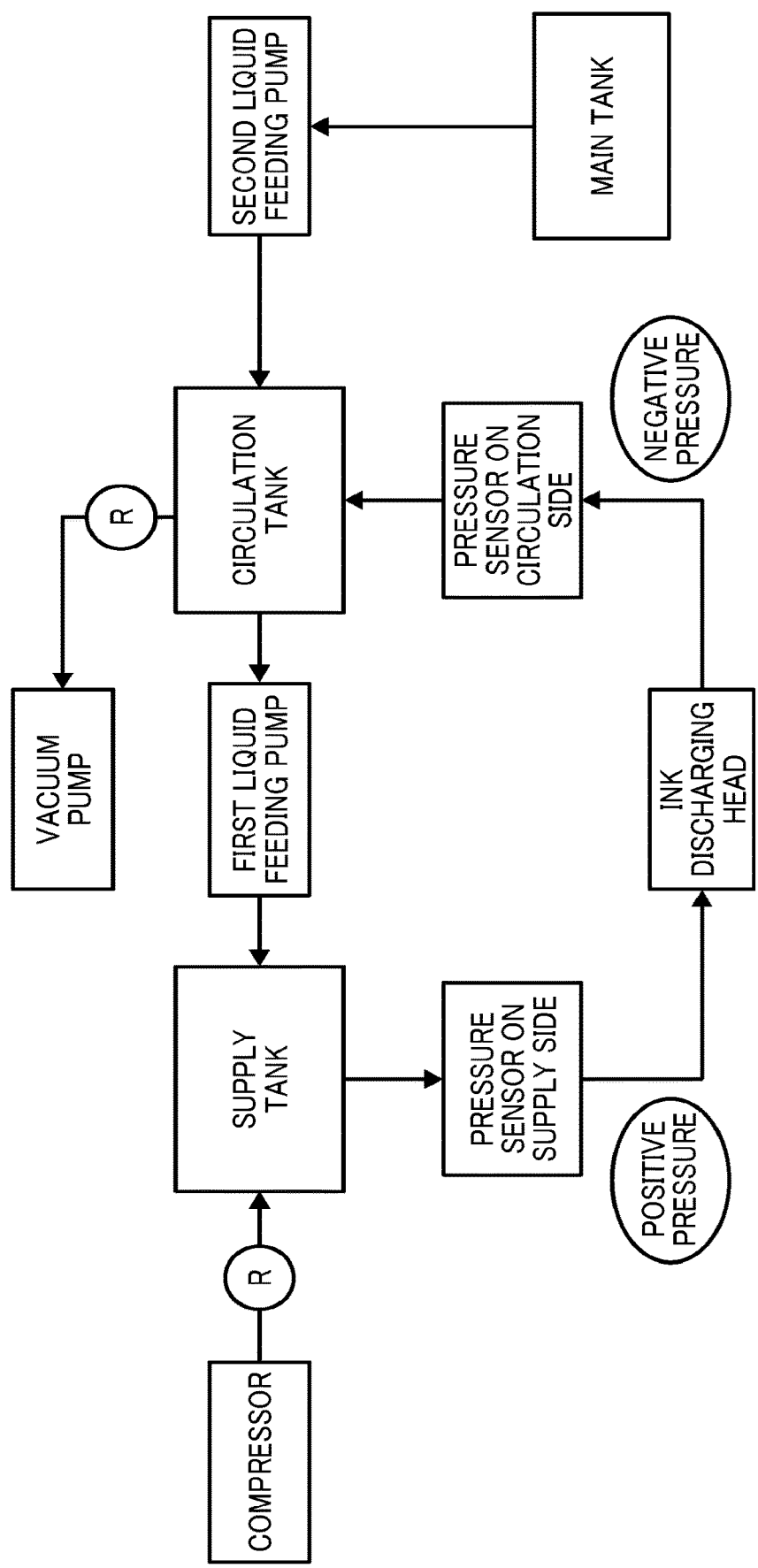
FIG. 4 is a block diagram illustrating an example of the system of liquid circulation relating to some embodiments of the present disclosure.

FIG. 4 is a block diagram illustrating the liquid circulation system relating to the present embodiment of the present disclosure.

As illustrated in FIGS. 3 and 4, the liquid circulation assembly such as a tank, an ink discharging head, a supply tank, a circulation tank, a pressure generating device (compressor), a vacuum pump, a liquid feeding pump, a regulator (R), a pressure sensor on the supply side, and a pressure sensor on the circulation side. The pressure sensor on the supply side is disposed between the supply tank and the ink discharging head and connected on the supply flow channel side connected with the supply port 71 of the ink discharging head. The pressure sensor on the circulation side is disposed between the ink discharging head 404 and the circulation tank and connected on the circulation flow channel side connected to the circulation port 81 of the ink discharging head 404.

One end of the circulation tank is connected to the supply tank via the first liquid feeding pump and, the other end, with the main tank via the second liquid feeding pump. Due to this configuration, the liquid flows from the supply tank into the ink discharging head through the supply port 71 and ejected to the circulation tank through the circulation port. Furthermore, the liquid is sent from the circulation tank to the supply tank by the first liquid feeding pump to circulate the liquid.

In addition, a compressor is connected to the supply tank, which is controlled in order that the pressure sensor on the supply side can detect a predetermined positive pressure. In addition, a vacuum pump is connected to the circulation tank, which is controlled in order that the pressure sensor on the circulation side can detect a predetermined negative pressure. Therefore, the negative pressure of the meniscus can be maintained constant while circulating the liquid through the ink discharging head.

In addition, as a liquid droplet is discharged from the nozzle of the ink discharging head, the amount of the liquid in the supply tank and the circulation tank decreases. Therefore, it is desirable to replenish the liquid from the main tank to the circulation tank using the second liquid feeding pump on suitable occasions. When to replenish the liquid from the main tank to the circulation tank can be controlled based on the detection result of, for example, a liquid surface sensor disposed in the circulation tank to replenish the liquid when the liquid surface height of the liquid in the circulation tank becomes lower than a predetermined height.

Next, the circulation of the liquid in the head is described. As illustrated in FIG. 3, the supply port 71 communicating with the common liquid chamber and the circulation ports 81 communicating with the circulation common liquid chamber are formed at ends of the common liquid chamber member 20. The supply port 71 and the circulation ports 81 are respectively connected with the ink supply tank and the circulation tank to store the liquid via respective tubes. The liquid stored in the supply tank is supplied to the individual liquid chambers via the supply port 71 and others.

Moreover, while the liquid in the individual liquid chambers is discharged from nozzles, all or part of the liquid not discharged but remaining in the individual liquid chambers circulates to the circulation tank via the circulation ports 81.

The liquid can be circulated during both operation and downtime of the head. Circulation of the liquid during downtime is preferable because the liquid in the individual liquid chamber 6 is always refreshed and the components contained in the liquid is prevented from agglomerating or settling out.

Figure 5:
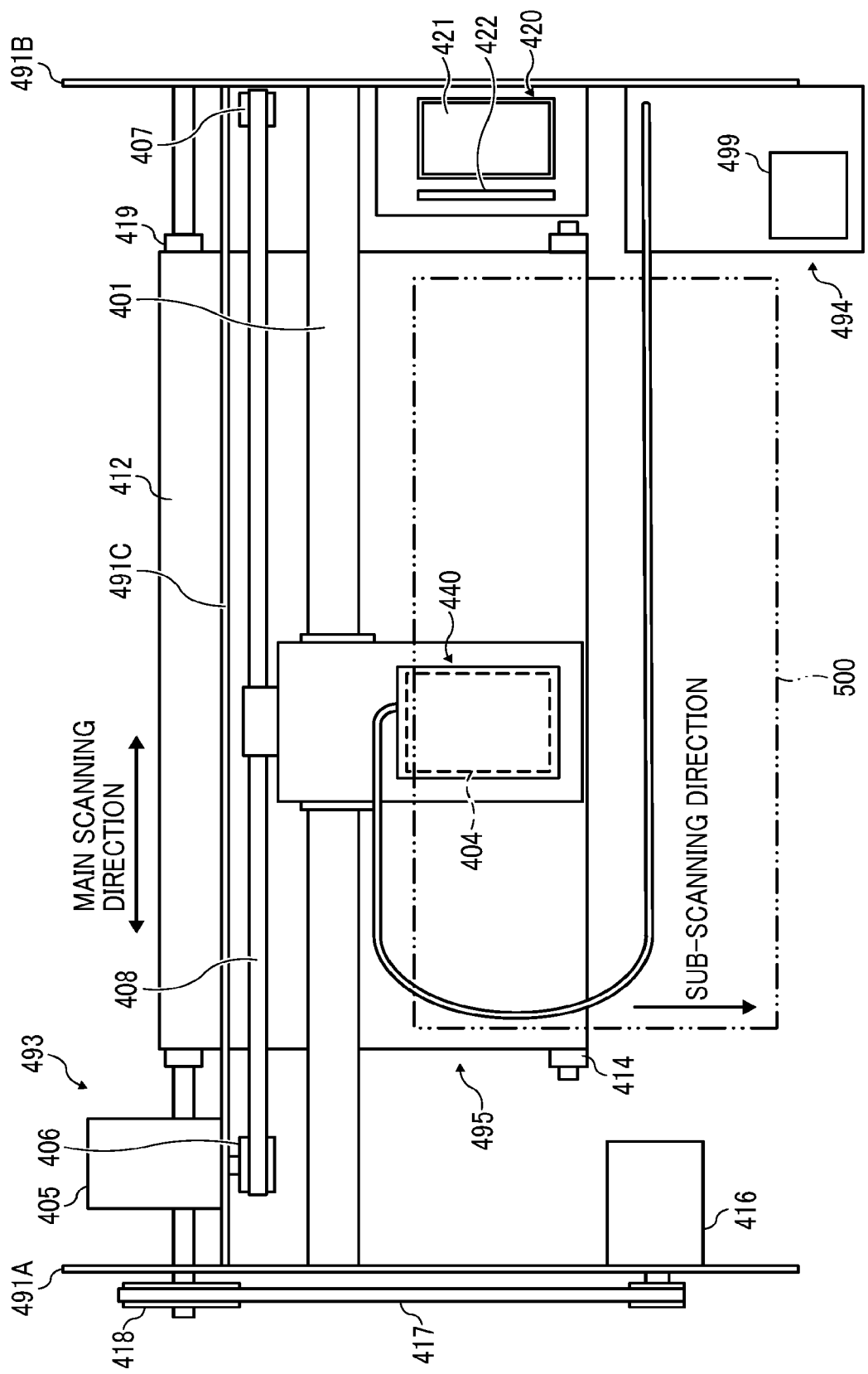
FIG. 5 is a diagram illustrating planar view of an example of a device that discharges ink using a circulation type discharging head.
Figure 6:
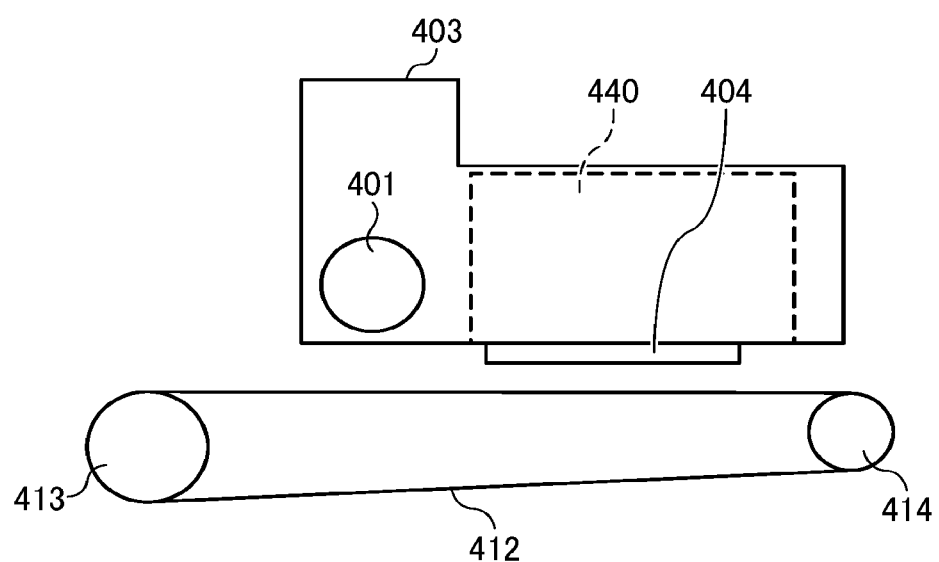
FIG. 6 is a diagram illustrating a side view of a part of the device illustrated in FIG. 5. The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

Next, an example of a device that discharges ink using a circulation discharging head is described with reference to FIGS. 5 and 6. FIG. 5 is a diagram illustrating a plane view illustrating an example of the substantial part of the device and FIG. 6 is a diagram illustrating a side view of the substantial part of the device.

This device is a serial type, and a main scanning moving assembly 493 reciprocates the carriage 403 in the main scanning direction. The main scanning moving assembly 493 includes a guiding member 401, a main scanning motor 405, and a timing belt 408. The guiding member 401 is bridged between a side plate 491A and a side plate 491B disposed on the right and left sides, respectively and holds the carriage 403 movable. The main scanning motor 405 reciprocates the carriage 403 in the main scanning direction via the timing belt 408 stretched between a drive pully 406 and a driven pully 407.

The carriage 406 carries an ink discharging unit 440 on which an ink discharging head 404 is mounted. The ink discharging head 404 of the ink discharging unit 440 discharges an ink mixture of red and green and each color ink of red (R), green (G), and blue (B) as one combination. The ink discharging head 404 carries a nozzle line having multiple nozzles along the sub-scanning direction vertical to the main scanning direction with the ink discharging surface downward.

A circulation assembly 494 including a pressure generating device (compressor) 499 supplies and circulates ink in the ink discharging head 404 to supply the ink stored outside the ink discharging head 404 to the ink discharging head 404. In this embodiment, the circulation assembly 494 includes a supply tank, a circulation tank, a compressor (pressure generating device), a vacuum pump, a liquid feeding pump, a regulator (R), etc. The pressure sensor on the supply side is disposed between the supply tank and the ink discharging head 404 and connected on the supply flow channel side connected to the supply port 71 of the ink discharging head 404. The pressure sensor on the circulation side is disposed between the ink discharging head 404 and the circulation tank and connected to the circulation flow channel side connected to the circulation port 81 of the ink discharging head 404.

This device includes a conveyance assembly 495 to convey a recording medium 500. The conveyance assembly 495 includes a conveyor belt 412 as a conveying device and a sub-scanning motor 416 to drive the conveyor belt 412.

The conveyor belt 412 adsorbs the recording medium 500 and conveys it to the position facing the ink discharging head 404. The conveyor belt 412 has an endless form, stretched between a conveyor roller 413 and a tension roller 414. The conveyor belt 412 electrostatically adsorbs or aspirates the recording medium 500.

The conveyor belt 412 is moved around in the sub-scanning direction by the conveyor roller 413 rotationally driven by the sub-scanning motor 416 via a timing belt 417 and a timing pully 418.

Furthermore, on one side of the carriage 403 in the main scanning direction, a maintenance and recovery assembly 420 to maintain and recover the ink discharging head 404 is disposed on the side of the conveyor belt 412.

The maintenance and recovery assembly 420 includes a capping member 421 to cap a nozzle surface (surface on which the nozzle is formed) of the ink discharging head 404, a wiping member 422 (wiper) to wipe off the nozzle surface, etc.

The main scanning moving assembly 493, the circulation assembly 494, the maintenance and recovery assembly 420, and the conveyance assembly 495 are mounted onto a housing including the side plates 491A and 491B and a back plate 491C.

In the image forming device having such a configuration, the recording medium 500 is fed and adsorbed onto the conveyor belt 412 and conveyed along the sub-scanning direction by the rotational movement of the conveyor belt 412.

Thereafter, the ink discharging head 404 is driven in response to an image signal while moving the carriage 403 in the main-scanning direction so that the ink is discharged onto the recording medium 500 standing still to record an image. Since this device includes a circulation discharging head, quality images can be stably formed.

This printing device may include not only a portion to discharge ink but also a device referred to as a pre-processing device and a post-processing device.

As an example of the pre-processing device and the post-processing device, the pre-processing device and the post-processing device may further include a liquid accommodating unit including a pre-processing liquid or a post-processing liquid like the ink including the ink mixture of red and green and each color ink of red (R), green (G), and blue (B) as one combination and an ink discharging head that discharges the pre-processing liquid or the post-processing liquid by inkjet printing.

It is possible to dispose a pre-processing device and a post-processing device in one embodiment which do not employ the inkjet printing method but a blade coating method, a roll coating method, or a spray coating method.

Notably, the ink is applicable not only to the inkjet printing but can be widely applied in other methods. Specific examples of such methods other than the inkjet printing include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to produce two-dimensional text and images and furthermore used as a material for solid fabrication for manufacturing a solid fabrication object (or solid freeform fabrication object).

The solid fabrication apparatus to fabricate a solid fabrication object can be any known device with no particular limit. For example, the apparatus includes a container, supplying device, discharging device, drier of ink, and others. The solid fabrication object includes an object manufactured by repetitively coating ink. In addition, the solid fabrication object includes a mold-processed product manufactured by processing a structure having a substrate such as a recording medium to which the ink is applied. The molded processed product is manufactured from recorded matter or a structure having a form such as a sheet-like form, and film-like form. by, processing such as heating drawing or punching. The molded processed product is suitably used for articles which are molded after surface-decorating. Examples include, but are not limited to, gauges or operation panels of vehicles, office machines, electric and electronic devices, and cameras.

Terms such as image forming, recording, printing, and print used in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, "parts" and "percent" are "parts by mass" and "percent by mass" unless otherwise specified.

Examples 1 to 18 and Comparative Examples 1 to 8

Preparation of Aqueous Liquid Dispersion of Coloring Material That Emits Visible Light at Ultraviolet Radiation A 2 L flask was equipped with a condenser, a thermometer, a 500 mL separatory funnel for loading monomers, and a stirrer, and placed in a warm water tank.

Next, 600 g of water, 10 g of sodium dodecylbenzene sulfonate (NEOPELEX No. 6, manufactured by Kao Corporation), and 5.5 g of higher alcohol-based ether (EMULGEN LS-114, manufactured by Kao Corporation) were loaded in this flask followed by heating the inside to 80 degrees C. during stirring.

Next, 3.5 g of potassium persulfate (manufactured by Tokyo Chemical Industry Co. Ltd.) was loaded into the flask at 80 degrees C. and a monomer mixture of 252 g of styrene (manufactured by Tokyo Chemical Industry Co. Ltd.), 108 g of acrylonitrile (manufactured by Tokyo Chemical Industry Co. Ltd.), and 40 g of acrylic acid (manufactured by Tokyo Chemical Industry Co. Ltd) was added dropwise from the separatory funnel to the flask in three hours during stirring followed by resting for one hour to complete polymerization.

A total of 18 g of a sodium salt of formaline condensate of βnaphtalene sulfonic acid (DEMOL NL, manufactured by Kao Corporation) and 4 g of a complex of europium: 4,4,4,-trifuloro-1-(2-thienyl-1,3-butanedione (manufactured by Sinloihi Co., Ltd.) were added dropwise at room temperature to the flask during stirring to obtain a homogeneous mixture and then the system was slowly heated to and maintained at 80 degrees C. to complete dyeing in one hour to obtain an aqueous liquid dispersion (Red liquid dispersion A) of milky white particles having a particle diameter of 0.1 µm that emitted red visible light at exposure to ultraviolet radiation.

A total of 18 g of a sodium salt of formaline condensate of special aromatic series sulfonic acid (DEMOL SC-30, manufactured by Kao Corporation) and 4 g of 3-(2-quinolilmethylene)isoindoline-1-one (FP Yellow M, manufactured by Mitsui Chemicals, Inc.) were added dropwise to the mixture at room temperature during stirring in the same manner to obtain a homogeneous mixture and then the system was slowly heated to and maintained at 80 degrees C. to complete dyeing in one hour to obtain an aqueous liquid dispersion (Green liquid dispersion A) of pale yellow particles having a particle diameter of 0.1 μm that emitted green visible light at exposure to ultraviolet radiation.

Preparation of Ink

The organic solvents, surfactants, defoaming agents, pH regulators, fluorescent brighteners, preservatives and fungicides, and deionized water shown in Tables 1-1 to 1-3 were mixed followed by stirring for one hour. The mixture was further stirred to another hour to obtain a homogeneous mixture. Thereafter, each aqueous liquid dispersion was added followed by stirring for one hour. Deionized water was added to make the entire 100 percent by mass to obtain a homogeneous mixture. The thus-obtained mixture was filtered with a polyvinilydene fluoride membrane filter having an average pore diameter of 0.8 μm under pressure to remove coarse particles and dust to obtain the inks of Examples 1 to 18 and Comparative Examples 1 to 8.

The values of the aqueous liquid dispersions in Tables 1-1 to 1-3 represent the proportion (percent by mass) of the solid contents.

The solid contents contain a coloring material and a resin present as the solid contents.

Hue Angle and Emission Maximum of Dry Film of Aqueous Liquid Dispersion of Coloring Material That Emits Visible Light at Exposure to Ultraviolet Radiation Red liquid dispersion A (prepared according to the preparation mentioned above)

Hue angle=25.1 degrees, emission maximum of 620 nm at 365 nm

Red liquid dispersion B (prepared in the same manner as for the Red liquid dispersion A mentioned above except that a complex of europium:4,4,4-trifluoro-1-phenyl-1,3-butanedione, manufactured by Sinloihi Co., Ltd. was used as the red coloring material).

Hue angle=23.4 degrees, emission maximum of 628 nm at 365 nm

Green liquid dispersion A (prepared according to the preparation mentioned above)

Hue angle=131.0 degrees, emission maximum of 530 nm at 365 nm

Green liquid dispersion B (prepared in the same manner as for the Green liquid dispersion A mentioned above except that Basic Yellow 40, manufactured by Ciba Speciality Chemicals, was used as the green coloring material).

Hue angle=129.4 degrees, emission maximum of 520 nm at 365 nm

Organic Solvent

Organic solvent A (glycerin, SP value=17.4 $(cal/cm^3)^{0.5}$, manufactured by Sakamoto Yakuhin Co., Ltd.)

Organic solvent B (1,2-butanediol, SP value=13.1 $(cal/cm^3)^{0.5}$, manufactured by Tokyo Chemical Industry Co., Ltd.)

Organic solvent C (3-ethyl-3-hydroxymethyloxetane, SP value=11.0 $(cal/cm^3)^{0.5}$, manufactured by Tokyo Chemical Industry Co., Ltd.)

Silicone-based Surfactant

Silicone-based surfactant A (KF-640, manufactured by Shin-Etsu Chemical Co., Ltd.) Surfactant B (Surfynol 465, manufactured by Nissin Chemical Industry Co., Ltd.)

Defoaming Agent

KM-72F, manufactured by Shin-Etsu Silicone Co., Ltd.

Fluorescent Brightener

Optiact I-10, manufactured by SAN NOPCO LIMITED pH regulator

2-Amino-2-ethyl-1,3-propane diol (AEPD, manufactured by Tokyo Chemical Industry Co., Ltd.)

Preservatives and Fungicides

LV(S), manufactured by Avecia Inkjet Limited

Printing Method

A print chart as a print sample was prepared by applying the inks shown in Tables 1-1 to 1-3 to a print medium A (OK Prince high grade, 55 kg, containing a fluorescent brightener, $a^*=9.4$, $b^*=-28.8$, manufactured by an PAPER CO., LTD.) and a print medium B (My Paper, manufactured by Ricoh Co., Ltd., to which a fluorescent brightener was applied, $a^*=22.5$, $b^*=-54.2$) with a print resolution of 600 dpi×600 dpi and an amount attached at 0.8 mg/cm² by an image forming apparatus (IPSiO Gxe5500, manufactured by Ricoh Co., Ltd.) followed by drying at room temperature for one day one night. The print chart used was a solid image of 3 cm square formed with dot patterns.

Method of Measuring Color Tone

The print sample placed in a dark room was exposed to ultraviolet radiation emitted from fluorescent lamp type blue black light having a wavelength of 370 nm. The data of the color tone ($a^*$ and $b^*$) measured with a light-shield tubular colorimeter (52002, manufactured by Yokogawa Instruments) were represented according to CIE 1976 $L^*a^*b^*$ colorimetric system. CIE 1976 $L^*a^*b^*$ colorimetric system was regulated at Commission Internationale de l'Eclairage (CIE) in 1976. $L^*$ represents luminosity and $a^*$ and $b^*$ represent color hue and chroma. $a^*$, $-a^*$, $b^*$, and $-b^*$ represent respectively red direction, green direction, yellow direction, and blue direction.

The distance between the fluorescent lamp type blue black light and the print sample was adjusted such that the illumination of ultraviolet by an ultraviolet illuminator (UV-M02, manufactured by Orc Manufacturing Co., Ltd.) was 2.0 mW/cm².

Samples for measuring the color tone were prepared by applying 5 mm of each of the red liquid dispersion and the green liquid dispersion onto a glass substrate with a bar coater with an amount of 0.8 mg/cm² and drying the liquid dispersions at 80 degrees C. for three hours and the color tone ($*a$, $b^*$) of the samples were measured. The hue angle was calculated by the obtained $a^*$ and $b^*$ values.

Method of Measuring Fluorescent Wavelength

Liquid dispersions containing each fluorescent material of red and green and the obtained inks were exposed to ultraviolet radiation having a wavelength of 365 nm to measure the fluorescence emission maximum with a spectrophotometer (FP-6500, manufactured by JASCO Corporation).

The ink had the fluorescence emission maximum derived from each coloring material contained in the ink.

Method of Measuring Zeta Potential

The liquid sample diluted with deionized water to achieve a total concentration of the resin particles dyed with each coloring material in the stealth ink of 0.01 percent by mass was placed in a zeta potential measuring device (ELSZ-2000, manufactured by OTSUKA ELECTRONICS CO., LTD.) to measure the zeta potential after the pH of the sample was adjusted to 9 with 0.1 mol/l hydrochrolic acid and 0.5 mol/l sodium hydroxide.

Method of Evaluating Storage Stability

The stealth ink was placed in a sealed bottle (Iboy, manufactured by AS ONE Corporation) and stored in a thermostatic chamber (PR-3J, manufactured by ESPEC Corp.) at 70 degrees C. for 14 days. The viscosity of the stealth ink was measured before and after the storage with a viscometer (RE-85L, manufactured by TOKI SANGYO CO., LTD.). The ink having a viscosity change rate within −5 to +5 percent was suitable for practical purpose.

Measuring Method 1 of Discharging Stability

A 10 cm square solid image was printed with a stealth ink with a run length of 100 by an image forming apparatus (IPSiO Gxe 5500, manufactured by Ricoh Co., Ltd.) at a printing resolution of 600 dpi×600 dpi and an amount of the liquid composition attached at 0.8 mg/cm², and the number of non-discharging nozzles was visually counted to evaluate the discharging stability by visually counting according to the following evaluation criteria. The stealth ink was evaluated as suitable for practical purpose when the number of non-discharging nozzles was 5 or less.

Evaluation Criteria
S: The number of non-discharging nozzles was zero
A: The number of non-discharging nozzles was two or less
B: The number of non-discharging nozzles was three to five
C: The number of non-discharging nozzles was six or more Measuring Method 2 of Discharging Stability The stealth ink was placed in an image forming apparatus (remodeled based on IPSiO Gxe 5500, manufactured by Ricoh Co., Ltd.) having an ink discharging head including an ink circulation mechanism and evaluated. The ink accommodating unit was filled with the ink and allowed to rest at 35 degrees C. and 30 percent RH for 24 hours. The ink was circulated for two minutes per hour.

The circulation mechanism was operated for one minute just before printing. A nozzle check pattern was printed on a print medium (My Paper, manufactured by Ricoh Co., Ltd.) in an environment of 35 degrees C. and 30 percent RH and the number of the non-discharging nozzles of all of the 385 nozzles was counted and evaluated according to the following evaluation criteria. Grade B or above is desirable for practical purpose.

Evaluation Criteria
S: The number of non-discharging nozzles was zero
A: The number of non-discharging nozzles was two or less
B: The number of non-discharging nozzles was three to five
C: The number of non-discharging nozzles was six or more

TABLE 1-1

| | | Recording medium A (a* = 9.4, b* = 28.8) | | | |
|---|---|---|---|---|---|
| Color tone of substrate at exposure to ultraviolet radiation | | R color alone Comparative Example 1 | Gr color alone Comparative Example 2 | Mixture of R and G Comparative Example 3 | Mixture of R and G Comparative Example 4 |
| Aqueous dispersion (solid portion) | Red liquid dispersion A | 18.00 | | 15.65 | 12.41 |
| | Red liquid dispersion B | | | | |
| | Green liquid dispersion A | | 18.00 | 2.35 | 5.59 |
| | Green liquid dispersion B | | | | |
| Organic solvent | Gly | 20.00 | 19.00 | 20.00 | 20.00 |
| | 1,2-BD | | | | |
| | EHO | | | | |
| Surfactant | Surfactant A (KF-640) | 0.50 | 0.50 | 0.50 | 0.50 |
| | Surfactant B (Surfynol 465) | | | | |
| Defoaming agent | KM-72F | 0.15 | 0.15 | 0.15 | 0.15 |
| Fluorescent brightener | Optiact I-10 | | | | |
| pH regulator | AEPD | 1.00 | 1.00 | 1.00 | 1.00 |
| Preservatives and fungicides | LV | 0.05 | 0.05 | 0.05 | 0.05 |
| Water | Deionized water | Balance | Balance | Balance | Balance |
| | Total | 100.00 | 100.00 | 100.00 | 100.00 |
| Color tone | a* | 15.8 | −26.7 | 4.8 | −5.5 |
| | b* | 8.6 | 18.2 | 1.7 | 1.5 |
| | L* | 9.7 | 27.0 | 15.4 | 22.3 |
| (Ref.) RB ratio | Red ratio | 100.0 | 0.0 | 87.0 | 69.0 |
| | Green ratio | 0.0 | 100.0 | 13.0 | 31.0 |
| Solvent SP value (cal/cm³)$^{0.5}$ | | 17.4 | 17.4 | 17.4 | 17.4 |
| Zeta potential (mV) | | −25.2 | −28.5 | −28.5 | −28.5 |
| Viscosity change rate (percent) before and after storage | | 0.8 | 0.8 | 0.8 | 0.8 |
| Discharging stability 1 | | S | S | S | S |
| Discharging stability 2 (with circulation) | | S | S | S | S |

TABLE 1-1-continued

| Color tone of substrate at exposure to ultraviolet radiation | | Recording medium A (a* = 9.4, b* = 28.8) | | | |
|---|---|---|---|---|---|
| | | Mixture of R and G Example 1 | Mixture of R and G Example 2 | Mixture of R and G Example 3 | Mixture of R and G Example 4 |
| Aqueous dispersion (solid portion) | Red liquid dispersion A | 14.40 | 13.33 | 13.14 | 13.74 |
| | Red liquid dispersion B | | | | |
| | Green liquid dispersion A | 3.60 | 4.67 | 4.86 | 4.30 |
| | Green liquid dispersion B | | | | |
| Organic solvent | Gly | 20.00 | 20.00 | 20.00 | 20.00 |
| | 1,2-BD | | | | |
| | EHO | | | | |
| Surfactant | Surfactant A (KF-640) | 0.50 | 0.50 | 0.50 | 0.50 |
| | Surfactant B (Surfynol 465) | | | | |
| Defoaming agent | KM-72F | 0.15 | 0.15 | 0.15 | 0.15 |
| Fluorescent brightener | Optiact I-10 | | | | |
| pH regulator | AEPD | 1.00 | 1.00 | 1.00 | 1.00 |
| Preservatives and fungicides | LV | 0.05 | 0.05 | 0.05 | 0.05 |
| Water | Deionized water | Balance | Balance | Balance | Balance |
| | Total | 100.00 | 100.00 | 100.00 | 100.00 |
| Color tone | a* | 0.8 | −1.9 | −2.0 | −0.6 |
| | b* | −1.1 | −0.4 | −1.4 | 0.0 |
| | L* | 22.3 | 20.1 | 21.5 | 18.2 |
| (Ref.)RB ratio | Red ratio | 80.0 | 74.1 | 73.0 | 76.2 |
| | Green ratio | 20.0 | 25.9 | 27.0 | 23.8 |
| Solvent SP value (cal/cm³)$^{0.5}$ | | 17.4 | 17.4 | 17.4 | 17.4 |
| Zeta potential (mV) | | −28.5 | −28.5 | −28.5 | −28.5 |
| Viscosity change rate (percent) before and after storage | | 0.8 | 0.8 | 0.8 | 0.8 |
| Discharging stability 1 | | S | S | S | S |
| Discharging stability 2 (with circulation) | | S | S | S | S |

TABLE 1-2

| Color tone of substrate at exposure to ultraviolet radiation | | Recording medium B (a* = 22.5, b* = −54.2) | | | |
|---|---|---|---|---|---|
| | | R color alone Comparative Example 5 | Gr color alone Comparative Example 6 | Mixture of R and G Comparative Example 7 | Mixture of R and G Comparative Example 8 |
| Aqueous dispersion (solid portion) | Red liquid dispersion A | 18.00 | | 9.00 | 13.76 |
| | Red liquid dispersion B | | | | |
| | Green liquid dispersion A | | 18.00 | 9.00 | 4.24 |
| | Green liquid dispersion B | | | | |
| Organic solvent | Gly | 20.00 | 19.00 | 20.00 | 20.00 |
| | 1,2-BD | | | | |
| | EHO | | | | |

TABLE 1-2-continued

| | | | | | |
|---|---|---|---|---|---|
| Surfactant | Surfactant A (KF-640) | 0.50 | 0.50 | 0.50 | 0.50 |
| | Surfactant B (Surfynol 465) | | | | |
| Defoaming agent | KM-72F | 0.15 | 0.15 | 0.15 | 0.15 |
| Fluorescent brightener | Optiact I-10 | | | | |
| pH regulator | AEPD | 1.00 | 1.00 | 1.00 | 1.00 |
| Preservatives and fungicides | LV | 0.05 | 0.05 | 0.05 | 0.05 |
| Water | Deionized water | Balance | Balance | Balance | Balance |
| | Total | 100.00 | 100.00 | 100.00 | 100.00 |
| Color tone | $a^*$ | 28.9 | −30.2 | −19.2 | 2.9 |
| | $b^*$ | −42.7 | 3.3 | 7.9 | −0.6 |
| | $L^*$ | 9.6 | 32.9 | 27.1 | 16.7 |
| (Ref.) RB ratio | Red ratio | 100.0 | 0.0 | 50.0 | 76.5 |
| | Green ratio | 0.0 | 100.0 | 50.0 | 23.5 |
| Solvent SP value $(cal/cm^3)^{0.5}$ | | 17.4 | 17.4 | 17.4 | 17.4 |
| Zeta potential | | −25.2 | −28.5 | −28.5 | −28.5 |
| Viscosity change rate (percent) before and after storage | | 0.8 | 0.8 | 0.8 | 0.8 |
| Discharging stability 1 | | S | S | S | S |
| Discharging stability 2 (with circulation) | | S | S | S | S |

| | | Recording medium B ($a^* = 22.5$, $b^* = -54.2$) | | | | |
|---|---|---|---|---|---|---|
| Color tone of substrate at exposure to ultraviolet radiation | | Mixture of R and G Example 5 | Mixture of R and G Example 6 | Mixture of R and G Example 7 | Mixture of R and G Example 8 | Mixture of R and G Example 9 |
| Aqueous dispersion (solid portion) | Red liquid dispersion A | 12.86 | 12.46 | 13.20 | 13.50 | 14.17 |
| | Red liquid dispersion B | | | | | |
| | Green liquid dispersion A | 5.14 | 5.54 | 4.80 | 4.50 | 3.83 |
| | Green liquid dispersion B | | | | | |
| Organic solvent | Gly 1,2-BD EHO | 20.00 | 20.00 | 20.00 | 20.00 | 20.00 |
| Surfactant | Surfactant A (KF-640) | 0.50 | 0.50 | 0.50 | 0.50 | 0.50 |
| | Surfactant B (Surfynol 465) | | | | | |
| Defoaming agent | KM-72F | 0.15 | 0.15 | 0.15 | 0.15 | 0.15 |

TABLE 1-2-continued

| | | | | | | |
|---|---|---|---|---|---|---|
| Fluorescent brightener | Optiact I-10 | | | | | |
| pH regulator | AEPD | 1.00 | 1.00 | 1.00 | 1.00 | 1.00 |
| Preservatives and fungicides | LV | 0.05 | 0.05 | 0.05 | 0.05 | 0.05 |
| Water | Deionized water | Balance | Balance | Balance | Balance | Balance |
| | Total | 100.00 | 100.00 | 100.00 | 100.00 | 100.00 |
| Color tone | a* | −1.6 | −2.0 | −0.6 | 1.8 | 2.0 |
| | b* | −7.8 | −10.0 | −5.4 | −2.1 | −4.5 |
| | L* | 18.2 | 20.1 | 20.3 | 18.8 | 16.8 |
| (Ref.) RB ratio | Red ratio | 71.4 | 69.2 | 73.3 | 75.0 | 78.7 |
| | Green ratio | 28.6 | 30.8 | 26.7 | 25.0 | 21.3 |
| Solvent SP value $(cal/cm^3)^{0.5}$ | | 17.4 | 17.4 | 17.4 | 17.4 | 17.4 |
| Zeta potential | | −28.5 | −28.5 | −28.5 | −28.5 | −28.5 |
| Viscosity change rate (percent) before and after storage | | 0.8 | 0.8 | 0.8 | 0.8 | 0.8 |
| Discharging stability 1 | | S | S | S | S | S |
| Discharging stability 2 (with circulation) | | S | S | S | S | S |

TABLE 1-3

| | | Recording medium B (a* = 22.5, b* = −54.2) | | | |
|---|---|---|---|---|---|
| Color tone of substrate at exposure to ultraviolet radiation | | Mixture of R and G Example 10 | Mixture of R and G Example 11 | Mixture of R and G Example 12 | Mixture of R and G Example 13 |
| Aqueous dispersion (solid portion) | Red liquid dispersion A | 13.20 | 13.20 | 13.20 | 12.86 |
| | Red liquid dispersion B | | | | |
| | Green liquid dispersion A | 4.80 | 4.80 | 4.80 | 5.14 |
| | Green liquid dispersion B | | | | |
| Organic solvent | Gly | 10.00 | | | 20.00 |
| | 1,2-BD | 10.00 | 20.00 | 17.00 | |
| | EHO | | | 3.00 | |
| Surfactant | Surfactant A (KF-640) | 0.50 | 0.50 | 0.50 | |
| | Surfactant B (Surfynol 465) | | | | 0.50 |
| Defoaming agent | KM-72F | 0.15 | 0.15 | 0.15 | 0.15 |
| Fluorescent brightener | Optiact I-10 | | | | |
| pH regulator | AEPD | 1.00 | 1.00 | 1.00 | 1.00 |
| Preservatives and fungicides | LV | 0.05 | 0.05 | 0.05 | 0.05 |
| Water | Deionized water | Balance | Balance | Balance | Balance |
| | Total | 100.00 | 100.00 | 100.00 | 100.00 |
| Color tone | a* | −0.5 | −0.3 | 0.3 | −1.1 |
| | b* | −5.5 | −5.9 | −6.0 | −5.5 |
| | L* | 19.0 | 18.8 | 19.0 | 17.1 |
| (Ref.) RB ratio | Red ratio | 73.3 | 73.3 | 73.3 | 71.4 |
| | Green ratio | 26.7 | 26.7 | 26.7 | 28.6 |
| Solvent SP value $(cal/cm^3)^{0.5}$ | | 15.3 | 13.1 | 12.8 | 17.4 |
| Zeta potential | | −22.8 | −20.5 | −18.3 | −25.5 |
| Viscosity change rate (percent) before and after storage | | −2.0 | −4.8 | −5.2 | −1.1 |

TABLE 1-3-continued

| | | | | | |
|---|---|---|---|---|---|
| Discharging stability 1 | A | B | B | S | |
| Discharging stability 2 (with circulation) | S | S | S | S | |

Recording medium B (a* = 22.5, b* = −54.2)

| | | Mixture of R and G Example 14 | Mixture of R and G Example 15 | Mixture of R and G Example 16 | Mixture of R and G Example 17 | Mixture of R and G Example 18 |
|---|---|---|---|---|---|---|
| Color tone of substrate at exposure to ultraviolet radiation | | | | | | |
| Aqueous dispersion (solid portion) | Red liquid dispersion A | 12.86 | 12.86 | 12.86 | 13.50 | |
| | Red liquid dispersion B | | | | | 13.50 |
| | Green liquid dispersion A | 5.14 | 5.14 | 5.14 | 4.50 | |
| | Green liquid dispersion B | | | | | 4.50 |
| Organic solvent | Gly 1,2-BD EHO | 20.00 | 20.00 | 20.00 | 20.00 | 20.00 |
| Surfactant | Surfactant A (KF-640) | 0.50 | 0.50 | 0.50 | 0.50 | 0.50 |
| | Surfactant B (Surfynol 465) | | | | | |
| Defoaming agent | KM-72F | | 0.15 | 0.15 | 0.15 | 0.15 |
| Fluorescent brightener | Optiact I-10 | | | | 0.10 | |
| pH regulator | AEPD | 1.00 | 0.50 | 1.00 | 1.00 | 1.00 |
| Preservatives and fungicides | LV | 0.05 | 0.05 | 0.01 | 0.05 | 0.05 |
| Water | Deionized water | Balance | Balance | Balance | Balance | Balance |
| | Total | 100.00 | 100.00 | 100.00 | 100.00 | 100.00 |
| Color tone | a* | −0.3 | −1.5 | −1.7 | −0.1 | 0.9 |
| | b* | −6.0 | −8.0 | −7.7 | −5.1 | −6.3 |
| | L* | 16.8 | 18.0 | 18.2 | 23.4 | 17.1 |
| (Ref.) RB ratio | Red ratio | 71.4 | 71.4 | 71.4 | 75.0 | 75.0 |
| | Green ratio | 28.6 | 28.6 | 28.6 | 25.0 | 25.0 |
| Solvent SP value (cal/cm³)$^{0.5}$ | | 17.4 | 17.4 | 17.4 | 17.4 | 17.4 |
| Zeta potential | | −27.7 | −28.2 | −28.0 | −28.5 | −28.5 |
| Viscosity change rate (percent) before and after storage | | 0.5 | 1.0 | 1.1 | 0.8 | 0.8 |
| Discharging stability 1 | | S | S | S | S | S |
| Discharging stability 2 (with circulation) | | S | S | S | S | S |

Supplementary Description of Examples

The print medium A at exposure to ultraviolet radiation emitted blue light having a color tone of a* of 9.4 and b* of −28.8 and the print medium B at exposure to ultraviolet radiation emitted blue light having a color tone of a* of 22.5 and b* of −54.2. As seen in the results shown in Examples 1 (Red:Green=80.0:20.0) and Example 3 (Red:Green=71.4: 28.6), the stealth inks having different mixing ratios of the red coloring material to the green coloring material depending on the blue color tone were used for printing. The results indicate that printing with high whiteness is possible for both print media A and B.

Example 19

In Example 19, a print chart was printed on the print medium B (My Paper, manufactured by Ricoh Co., Ltd., to which fluorescent brightener was applied, a*=22.5, b*=−54.2) at a print resolution of 600 dpi×600 dpi and an amount of 0.8 mg/cm² by the image forming apparatus (IPSiO Gxe5500, manufactured by Ricoh Co., Ltd.) of Example 4. The print chart used was a solid image of 3 cm square formed of dot patterns.

The stealth ink of Example 4 was applied not followed by drying and the stealth non-white ink of green coloring material alone of Comparative Example 2 was applied to the region where the stealth ink had been applied. The resulting ink image was dried at room temperature for one day and one night to prepare a print sample.

The stealth ink of Example 4 was applied followed by drying and the stealth non-white ink of green coloring material alone of Comparative Example 2 was applied to the region where the stealth white ink had been applied. The resulting ink image was dried at room temperature for one day and one night to prepare a print sample.

The stealth white ink was dried at 90 degrees C. for one minute.

L*, a*, and b* values of the print samples were obtained according to the method mentioned above.

The results are shown in Table 2.

Comparative Example 9

The stealth non-white Ink of Comparative Example 2 was applied to a substrate (My Paper, manufactured by Ricoh Co., Ltd.) containing no fluorescent brightener at a print resolution of 600 dpi×600 dpi and an amount of 0.8 mg/cm². The resulting ink image was dried at room temperature for one day and one night to prepare a print sample. The print chart used was a solid image of 3 cm square formed with dot patterns.

L*, a*, and b* values of the print samples were obtained according to the method mentioned above.

The results are shown in Table 2.

TABLE 2

| Color tone of substrate at exposure to ultraviolet radiation | | a* = 0.3, b* = −0.2 Comparative Example 9 | a* = −22.5, b* = −54.2 Example 19 |
|---|---|---|---|
| First stealth ink | | — | Example 4 |
| Second stealth ink | | Comparative Example 2 | Comparative Example 2 |
| First ink without drying process | a* | — | −17.8 |
| | b* | — | 19.6 |
| | L* | — | 25.5 |
| First ink with drying process | a* | −39.0 | −38.1 |
| | b* | 45.5 | 43.8 |
| | L* | 35.3 | 31.2 |

The results of Comparative Example 9 of printing on a substrate free of a fluorescent brightener with the stealth ink of Comparative Example 2 are shown as the reference. The result of Example 19 indicates that the white layer formed on a substrate containing a fluorescent brightener with the ink for use in Example 4 followed by drying demonstrates the color tone on the same level with that of Comparative Example 9.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A method of printing a stealth white image, comprising:
applying a stealth ink containing a red coloring material that emits visible light at exposure to ultraviolet radiation and a green coloring material that emits visible light at exposure to ultraviolet radiation to a substrate which contains a fluorescent brightener to form the stealth white image thereon,
wherein the stealth white image demonstrates an a* value of from −2.0 to 2.0 and a b* value of from −10.0 to 0 at exposure to ultraviolet radiation having a wavelength of 370 nm according to CIE 1976 L*a*b* colorimetric system.

2. The method according to claim 1, wherein, in the applying, a mass ratio of the red coloring material to the green coloring material in the stealth ink is changed depending on a blue color tone of light the substrate emits at exposure to ultraviolet radiation.

3. The method according to claim 1, wherein the stealth ink demonstrates two fluorescence emission maxima of from 605 to 645 nm and from 505 to 545 nm at exposure to ultraviolet radiation having a wavelength of 365 nm.

4. The method according to claim 1, wherein the stealth ink further contains an organic solvent having a mixing SP value of 13.0 $(cal/cm^3)^{0.5}$ or greater.

5. The method according to claim 1, wherein the stealth ink further contains a polyether polyol.

6. The method according to claim 1, further comprising applying a stealth non-w % bite ink.

7. The method according to claim 1, further comprising drying the stealth ink after the applying.

8. The method according to claim 7, further comprising applying a stealth non-white ink after the drying.

9. The method according to claim 8, wherein, in the applying the stealth ink, the stealth ink is applied to one of an entire surface of the substrate and a same region of the substrate where the stealth non-white ink is applied.

10. A set of a substrate and a stealth ink, comprising:
the substrate containing a fluorescent brightener; and
the stealth ink containing a first stealth ink containing a red coloring material that emits visible light at exposure to ultraviolet radiation and a green coloring material that emits visible light at exposure to ultraviolet radiation and a second stealth ink,
wherein printed matter having the substrate with the first stealth ink applied thereto has an a* value of from −2.0 to 2.0 and a b* value of from −10.0 to 0 at exposure to ultraviolet radiation having a wavelength of 370 nm according to CIE 1976 L*a*b* colorimetric system.

11. The set according to claim 10, wherein the second stealth ink contains at least one member selected from the group consisting of a red coloring material that emits visible light at exposure to ultraviolet radiation, a green coloring material that emits visible light at exposure to ultraviolet radiation, and a blue coloring material that emits visible light at exposure to ultraviolet radiation.

12. The set according to claim 10, wherein a mass ratio of the red coloring material to the green coloring material in the first stealth ink is changed depending on a blue color tone of light the substrate emits at exposure to ultraviolet radiation.

13. A printing device comprising:
a container containing an ink that contains a stealth ink containing a red coloring material that emits visible light at exposure to ultraviolet radiation and a green coloring material that emits visible light at exposure to ultraviolet radiation;
an ink discharging head configured to discharge the ink to a substrate which contains a fluorescent brightener to form a stealth white image; and
a circulation assembly including a pressure generating device which is configured to circulate the ink,
wherein the stealth white image demonstrates an a* value of from −2.0 to 2.0 and a b* value of from −10.0 to 0 at exposure to ultraviolet radiation having a wavelength of 370 nm according to CIE 1976 L*a*b* colorimetric system.

14. The printing device according to claim 13, further comprising a second ink which contains a stealth non-white ink.

* * * * *